United States Patent [19]

Wimmer et al.

[11] Patent Number: 5,210,323
[45] Date of Patent: May 11, 1993

[54] PROCESS FOR THE PREPARATION OF ALKOXYLATES HAVING A NARROW DISTRIBUTION OF HOMOLOGS USING ANTIMONY PENTAHALIDE COMPLEXES AS THE CATALYST

[75] Inventors: Ignaz Wimmer, Winhöring; Rainer Kupfer, Kastl, both of Fed. Rep. of Germany

[73] Assignee: Hoechst Aktiengese llschaft, Frankfurt am Main, Fed. Rep. of Germany

[21] Appl. No.: 890,435

[22] Filed: May 28, 1992

[30] Foreign Application Priority Data

May 31, 1991 [DE] Fed. Rep. of Germany ....... 4117935

[51] Int. Cl.$^5$ ............................................. C07C 41/03
[52] U.S. Cl. .................................... 568/615; 568/616; 568/618; 568/620; 568/608
[58] Field of Search ............... 566/615, 616, 618, 620, 566/608

[56] References Cited

U.S. PATENT DOCUMENTS 3,359,331 12/1967 Baker et al. .
4,375,564 3/1983 Edwards .

FOREIGN PATENT DOCUMENTS 796508 6/1958 United Kingdom .

OTHER PUBLICATIONS

Persson, I., et al, *Inorganica Chimica Acta* 129:183-197 (1987).

*Primary Examiner*—Howard T. Mars

[57] ABSTRACT

In the process described for the preparation of alkoxylates having a narrow distribution of homologs by reaction of compounds containing at least one hydroxyl group with alkylene oxide, complex compounds of antimony pentahalide with a special Lewis base are used as the catalysts. Alkoxylates having a narrow distribution of homologs and good color quality are obtained at a high conversion.

7 Claims, No Drawings

PROCESS FOR THE PREPARATION OF ALKOXYLATES HAVING A NARROW DISTRIBUTION OF HOMOLOGS USING ANTIMONY PENTAHALIDE COMPLEXES AS THE CATALYST

The invention relates to a process for the preparation of alkoxylates having a narrow distribution of homologs by reaction of compounds containing at least one hydroxyl group with alkylene oxide in the presence of an antimony pentahalide complex as the catalyst.

It has been known for a long time, for example from British Patent No. 796,508, that antimony pentahalides as catalyst in the reaction of compounds containing active H atoms (for example in the form of hydroxyl groups) with alkylene oxide (for example ethylene oxide and/or propylene oxide) lead to alkoxylates having a narrow distribution of homologs. This advantage is counteracted by the disadvantage not only of more or less difficult handling of antimony pentahalides (strongly fuming, corrosive, sensitive to hydrolysis and the like) but in particular that of unsatisfactory color quality of the alkoxylate.

In order to overcome the disadvantages mentioned of antimony pentahalides, the attempt has already been made to use complex compounds of antimony pentahalides with alcohols, ethers, carboxylic acids or amines as alkoxylating catalyst, see, for example, U.S. Pat. Nos. 3,359,331 and 4,375,564. It is true that these catalysts, like antimony pentahalides as such, give narrow range alkoxylates, but their disadvantage is their relatively low activity.

Special antimony pentahalide complexes have now been found which not only have high alkoxylating activity but also lead to alkoxylates having a narrow distribution of homologs and good color quality. Moreover, they are easy and economical to prepare and handleable without difficulty. They are complex compounds formed from an antimony pentahalide and a specific Lewis base.

The process according to the invention for the preparation of alkoxylates having a narrow distribution of homologs by reaction of compounds containing at least one hydroxyl group with alkylene oxide in the presence of an antimony pentahalide complex as the catalyst comprises using a complex of antimony pentahalide with a Lewis base having a DS value of 24 to 36 $cm^{-1}$, preferably 24 to 34 $cm^{-1}$, in which the DS value of the Lewis base is defined as the difference in value between the symmetrical stretching frequency of the $HgBr_2$ molecule in the gas phase and in the Lewis base.

The Lewis bases to be used according to the invention are known, cf. the paper by Ingmar Persson published in the journal 'Inorganica Chimica Acta', 129 (1987), pages 183 to 197, under the title "On the Coordinating Properties of some Solvents". There the DS values under discussion are described in detail (see, in particular, page 183, left column, second paragraph, page 184, right column, penultimate paragraph and page 192, right column, last paragaph which follows on page 193) and listed individually for a number of corresponding complexes (see Table V on page 194).

Thus, in the process according to the invention, complex compounds of an antimony pentahalide, preferably antimony pentabromide or antimony pentachloride, with a Lewis base having a DS value of 24 to 36 $cm^{-1}$, preferably 24 to 34 $cm^{-1}$, are used. It is surprising that precisely these Lewis bases show the desired advantageous effects. Lewis bases having a DS value of less than 24 $cm^{-1}$ and those having a DS value of more than 36 $cm^{-1}$ leave much to be desired, for example with respect to the preparation of the complexes under discussion and/or with respect to the catalytic activity of the corresponding complex compounds (see comparative examples).

Preferred Lewis bases are those having a DS value of 24 to 36 $cm^{-1}$, preferably 24 to 34 $cm^{-1}$, and belonging to the group of O donors and N donors. Individual examples of preferred Lewis bases are: di-$C_1$- to $C_4$-alkyl sulfoxides, di-$C_1$- to $C_4$-alkyl sulfones, hexa-$C_1$- to $C_4$-alkylphosphoric triamides, N,N-(di-$C_1$- to $C_4$-alkyl)acylamides and N-$C_1$- to $C_4$-alkylpyrrolidones, "$C_1$- to $C_4$-alkyl" being preferably methyl or ethyl and "acyl" being preferably formyl, acetyl or propionyl.

Preparation of the complexes to be used according to the invention from an antimony pentahalide, preferably antimony pentabromide or antimony pentachloride, and one of the Lewis bases mentioned is simple. The exothermic reaction between the two components proceeds within a short period of time and quantitatively. As a rule, it is sufficient to combine the two components at a temperature of preferably 0 to 50° C. with stirring and, if necessary, cooling (in order to maintain the temperature mentioned), preferably in the presence of a solvent, after which the precipitated salt, i.e. the $SbX_5$/Lewis base complex, is separated off (filtered off) and dried (X = halogen). The two components are preferably used in a molar ratio of about 1:1, and the solvent in a 3- to 15-fold amount by weight compared with the amount by weight of the Lewis base compound used. Preferred inert solvents are halogenated hydrocarbons, such as dichloromethane (boiling point 40° C.), carbon tetrachloride (boiling point 77° C.), dichloroethane (boiling point 84° C.) and/or trifluorotrichloroethane (boiling point 48° C.). According to a preferred preparation procedure for the complexes to be used according to the invention, the Lewis base compound and the solvent are initially introduced into a reaction vessel. The antimony pentahalide is then added to this mixture continuously or in portions with stirring and while maintaining a temperature of preferably 0 to 50° C. and an inert gas atmosphere, for example of dry nitrogen. After addition of the antimony pentahalide, the $SbX_5$/Lewis base complex is present as a salt paste in the solvent used and is separated off therefrom, for example simply by filtering it off with or without suction, and, if desired, additionally dried at a temperature of preferably 20 to 80° C. and, if desired, in vacuo, in order to separate off the solvent completely. The $SbX_5$:/Lewis base complex compound thus obtained constitutes the alkoxylating catalyst to be used according to the invention.

The amount of catalyst to be used according to the invention can vary within wide limits and is in general 0.0005 to 0.05 mol per mole of the compound containing active H atoms. Using more than 0.05 mol does not usually achieve a higher catalytic effect and using less than 0.0005 mol significantly reduces the catalytic effect. Accordingly, the preferred amount of $SbX_5$:/Lewis base complex catalyst is 0.001 to 0.01 mol per mole of the compound containing active H atoms.

Alkoxylation of compounds containing hydroxyl groups, i.e. the reaction of such compounds with alkylene oxide, using the complex compounds described as the catalyst is carried out in the usual manner. Accordingly, the procedure is such that the compounds to be alkoxylated are brought to a temperature of 40 to 160° C., preferably 60 to 140° C., with stirring, and the alkylene oxide is metered in in portions or continuously, while maintaining the temperature mentioned. During the reaction, atmospheric pressure or elevated pressure can be present. As a rule, the alkoxylation is carried out at a pressure of 2 to 6 bar. After addition of the alkylene oxide is complete, the mixture is maintained at the temperature mentioned for some time for the purpose of afterreaction, during which the pressure keeps dropping, thus indicating the end of the reaction. The amount of alkylene oxide depends on the purpose for which the alkoxylate is used and is in general 1 to 30 mol, preferably 2 to 15 mol, and in particular 2 to 8 mol, per mole of compound to be alkoxylated. The reaction product obtained can often even be used as such, i.e. without separating off the catalyst. In the case where it is desired to obtain a catalyst-free alkoxylate, it is, for example, possible to add simply water or base to the reaction product in order to destroy the catalyst, and to separate off the organic phase (i.e. the alkoxylate) from the aqueous phase. A further effective purification method is described in Example 5.

The process according to the invention has a number of advantages. As a result of the high catalytic activity of the $SbX_5$/Lewis base complex described, virtually complete conversion, i.e. a high yield of alkoxylate, is achieved within a relatively short period of time. The alkoxylate does not only have a narrow distribution of homologs but also good color quality. A further advantage is that the complex compound can be handled with less difficulty and is a catalyst which is easier to meter in than the $SbX_5$ compound itself. The alkoxylates obtained are valuable products with a wide range of uses, for example as solvents, surfactants (detergents, cleaning agents and the like) and chemical intermediates.

Even though the type of alkylene oxides and compounds containing HO groups is not critical for the process according to the invention, the following may be pointed out:

Alkylene oxides which are preferably used are ethylene oxide, propylene oxide and/or butylene oxide, ethylene oxide and/or propylene oxide being preferred. Ethylene oxide is particularly preferred.

Suitable compounds containing hydroxyl groups are alcohols, amino alcohols, perfluoroalkyl alcohols, glycols, glycol monoethers, glycerol, phenols, cresols and the like, alcohols being preferred. They can originate from a natural source or from synthesis processes, be primary, secondary or tertiary, linear or branched, saturated or unsaturated, mono- or polyhydric, for example oxo alcohols, Guerbet alcohols, Ziegler alcohols, fatty alcohols and the like. Preferred alcohols are primary or secondary, straight-chain or branched $C_3$- to $C_{24}$-alkanols preferably $C_6$- to $C_{18}$-alkanols. Examples of the preferred alcohols are: butanol, amyl alcohol, hexanol, nonanol, isononyl alcohol, decanol, undecanol, isoundecanol, lauryl alcohol, isotridecyl alcohol, stearyl alcohol, coconut fatty alcohol and mixtures thereof, furthermore 2-ethylhexanol, 2-hexyldecanol, 2-octyldecanol and similar Guerbet alcohols. It has been found that alkoxylates having a narrow distribution of homologs and good color quality are obtained in high yields using the complex catalyst described even in the case of unsaturated alcohols and in the case of perfluoro alcohols. This is all the more surprising considering that especially in these cases antimony pentahalides more or less fail to function as catalysts. Preferred unsaturated alcohols are primary, straight-chain or branched $C_3$- to $C_{24}$-alcohols, preferably $C_6$- to $C_{18}$-alcohols, containing 1 to 3 double bonds, and preferred perfluoro alcohols are those of the formula $R_f(CH_2)_x$-OH, in which $R_f$ is $C_4F_9$ to $C_{18}F_{37}$, preferably $C_6F_{13}$ to $C_{16}F_{33}$, and x is 1, 2, 3 or 4, preferably 2.

The invention will now be described in more detail by means of examples and comparative examples, in which first the preparation of antimony pentahalide-/Lewis base complexes to be used according to the invention and then the alkoxylation of compounds containing active H atoms using these complexes as the catalyst will be described. The comparative examples are intended to substantiate the selective character of the complex compounds to be used according to the invention.

EXAMPLE 1

Preparation of an $SbCl_5$/dimethyl sulfoxide complex (catalyst A): 29.20 g (0.098 mol) of $SbCl_5$ were continuously added dropwise to a mixture of 7.65 g (0.098 mol) of dimethyl sulfoxide in 50 g of dichloromethane at a temperature of 30 to 50° C. with stirring and under dry nitrogen as the inert gas. The salt paste formed was filtered off from the supernatant dichloromethane layer and dried. The $SbCl_5$:/dimethyl sulfoxide complex compound obtained catalyst A has a theoretical molecular weight of 377.

EXAMPLE 2

Preparation of an $SbCl_5$/hexamethylphosphoric triamide complex (catalyst B): 29.90 g (0.10 mol) of $SbCl_5$ were continuously added dropwise to a mixture of 17.90 g (0.10 mol) of hexamethylphosphoric triamide in 100 g of dichloromethane at a temperature of 20 to 40° C. with stirring and under dry nitrogen as the inert gas. The salt paste formed was filtered off from the supernatant dichloromethane layer and dried. The $SbCl_5$/hexamethylphosphoric triamide complex compound obtained = catalyst B has a theoretical molecular weight of 478.

EXAMPLE 3

Preparation of an $SbCl_5$/N,N-dimethylacetamide complex (catalyst C): 29 90 g (0.10 mol) of $SbCl_5$ dissolved in 50 g of dichloromethane were continuously added dropwise to a mixture of 8.70 g (0.10 mol) of N,N-dimethylacetamide in 50 g of dichloromethane at a temperature of about 0° C. with stirring and dry nitrogen as the inert gas. After addition of the $SbCl_5$ solution, 50 g of diethyl ether were added to the mixture in order to precipitate the complex formed. The salt paste was filtered off from the supernatant solvent layer and dried. The $SbCl_5$/dimethyl-acetamide complex compound obtained = catalyst C has a theoretical molecular weight of 386.

EXAMPLE 4

Preparation of an $SbCl_5$/N-methyl-2-pyrrolidone complex (catalyst D): This complex was prepared by the procedure of Example 2, using 9.92 g (0.10 mol) of N-methylpyrrolidone and 29.90 g (0.10 mol) of $SbCl_5$. The $SbCl_5$/N-methylpyrrolidone complex compound obtained = catalyst D has a theoretical molecular weight of 398.

EXAMPLE 5

198.0 g (1.0 mol) of an n-$C_{12}$- to $C_{14}$-alkanol mixture and 1.13 g (0.003 mol) of catalyst A were initially introduced into a 1 liter stirred autoclave. 176.0 g (4.0 mol) of ethylene oxide were metered into the mixture heated to 80° C. at a temperature of initially 80° C. and increasing to 120° C. at the rate at which it reacted (the pressure in the autoclave was 2 to 3 bar), which required a reaction time of only 3 hours. After addition of the ethylene oxide, the mixture was stirred at 120° C. for another 2 hours for the purpose of afterreaction, after which the pressure remained constant at 1 bar and indicated the end of the reaction. In order to destroy the catalyst, 12 g of 10% NaOH solution were then added to the contents of the autoclave (the reaction product), the mixture was stirred at 130° C. for 2 hours under its own pressure, then brought to a pH of 6.6 with phosphoric acid, and the water was removed under vacuum (dried). Filtration gave 370 g of ethoxylate. The ethoxylate had a Hazen color number of 60 (measured by DIN 53 409) and the free alkanol content was 0.6% by weight (the alkanol content was determined by gas chromatography).

EXAMPLE 6

174.0 g (1.0 mol) of an n-$C_{11}$- and iso-$C_{11}$-alkanol mixture and 1.91 g (0.004 mol) of catalyst B were initially introduced into a 1 liter stirred autoclave. 352.0 g (8.0 mol) of ethylene oxide were metered into the mixture heated to 80° C. at a temperature of initially 80° C. and increasing to 120° C. at the rate at which it reacted, which required a reaction time of only 4 hours. Further treatment and work-up took place as in Example 5. 523 g of ethoxylate were obtained. It had a Hazen color number of 60 and the free alkanol content was 0.1 % by weight.

EXAMPLE 7

529.0 g (2.0 mol) of an unsaturated n-$C_{18}s$- to $C_{18}$-alcohol mixture (iodine number 75) and 3.90 g (0.01 mol) of catalyst C were initially introduced into a 1 liter stirred autoclave. 264.0 g (6.0 mol) of ethylene oxide were metered into the mixture heated to 70° C. at this temperature at the rate at which it reacted, which required a reaction time of only 3 hours. Further treatment and work-up took place as in Example 5. 785 g of ethoxylate were obtained. It had a Hazen color number of 160 and the free alkanol content was 4 % by weight.

EXAMPLE 8

464.0 g (1.0 mol) of perfluorooctylethanol ($C_8F_{17}C_2H_4OH$) and 2.0 g (0.005 mol) of catalyst D were initially introduced into a 1 liter stirred autoclave. 176.0 g (4.0 mol) of ethylene oxide were metered into the mixture heated to 80° C. at a temperature of 80 to 90° C. at the rate at which it reacted, which required a reaction time of only 3 hours. Further treatment and work-up took place as in Example 5. 641 g of perfluorooctylethanolethoxylate were obtained. It had a Hazen color number of 60 and the free alcohol content was 2.2% by weight.

EXAMPLE 9

260.0 g (2.0 mol) of a 2-ethylhexanol and 1.60 g (0.004 mol) of catalyst D were initially introduced into a 1 liter stirred autoclave. 176.0 g (4.0 mol) of ethylene oxide were metered into the mixture heated to 60° C. at a temperature of 60 to 80° C. at the rate at which it reacted, which required a reaction time of only 2 hours. Further treatment and work-up took place as in Example 5. 430 g of ethoxylate were obtained. It had a Hazen color number of 100 and the free 2-ethylhexanol content was 4.1 % by weight.

The ethoxylates from Examples 5 to 9 have, as determined by gas chromatography, the desired narrow distribution of homologs.

COMPARATIVE EXAMPLE 1

Example 5 was repeated, except that 1.12 g (0.003 mol) of $SbCl_5$/diethyl ether complex were used as the catalyst instead of catalyst A (the DS value of diethyl ether is 12 $cm^{-1}$). The metering-in time was not 3 but 5 hours. The ethoxylate had a Hazen color number of 140 and the free alcohol content was 0.7% by weight.

COMPARATIVE EXAMPLE 2

The procedure of Example 7 was repeated, except that 3.0 g (0.01 mol) of pure $SbCl_5$ were used instead of catalyst C. Upon metering the 264.0 g (6.0 mol) of ethylene oxide into the mixture heated to 70° C. and containing the unsaturated $C_{16}$- to $C_{18}$-alcohol, it was found that after addition of about 44 g (0.5 mol) of ethylene oxide the reaction came to a standstill.

COMPARATIVE EXAMPLE 3

The procedure of Example 8 was repeated, except that 1.50 g (0.005 mol) of pure $SbCl_5$ were used instead of catalyst D. The free alcohol content in the perfluorooctylethanolethoxylate obtained was not 2.2 % by weight as in Example 8 but 7.4 % by weight.

COMPARATIVE EXAMPLE 4

Example 5 was repeated, except that 1.17 g (0.003 mol) of $SbCl_5$/pyridine complex were used as the catalyst instead of catalyst A (the DS value of pyridine is 38 $cm^{-1}$). Upon metering the ethylene oxide into the mixture heated to 80° C. and containing the $C_{12}$- to $C_{14}$-alcohol, the reaction, after addition of about 44 g (0.5 mol) of ethylene oxide, became very slow and then came to a standstill.

COMPARATIVE EXAMPLE 5

Example 5 was repeated, except that 1.20 g (0.003 mol) of $SbCl_5$/triethylamine complex were used as the catalyst instead of catalyst A (the DS value of triethylamine is 20 23 $cm^{-1}$). Upon metering the ethylene oxide into the mixture heated to 80° C. and containing the $C_{12}$- to $C_{14}$-alcohol, the reaction, after addition of about 44 g (0.5 mol) of ethylene oxide, came to a standstill.

We claim:

1. A process for the preparation of alkoxylates having a distribution of homologs by reaction of compounds containing at least one hydroxyl group with alkylene oxide in the presence of an antimony pentahalide complex as the catalyst, which comprises using a complex of antimony pentahalide with a Lewis base having a DS value of 24 to 36 $cm^{-1}$, in which the DS value of the Lewis base is defined as the difference in value between the symmetrical stretching frequency of the $HgBr_2$ molecule in the gas phase and in the Lewis base.

2. The process as claimed in claim 1, wherein a complex of antimony pentahalide with a Lewis base having a DS value of 24 to 34 $cm^{-1}$ is used.

3. The process as claimed in claim 1, wherein a complex of antimony pentahalide with a Lewis base is used, in which the Lewis base is selected from the group comprising O donors and N donors.

4. The process as claimed in claim 1, wherein a complex of antimony pentahalide with a Lewis base is used, in which the Lewis base is selected from the group comprising di-$C_1$- to $C_4$-alkyl sulfoxides, di-$C_1$- to $C_4$-alkyl sulfones, hexa-$C_1$- to $C_4$-alkylphosphoric triamides, N,N-(di-$C_1$- to $C_4$-alkyl)acylamides and N-$C_1$- to $C_4$-alkylpyrrolidones.

5. The process as claimed in claim 1, wherein the catalyst is used in an amount of 0.0005 to 0.05 mol per mole of compounds containing hydroxyl groups.

6. The process as claimed in claim 1, wherein the antimony pentahalide used is antimony pentabromide or antimony pentachloride, the alkylene oxide used is ethylene oxide or propylene oxide and the compounds containing hydroxyl groups used are straight-chain or branched, saturated or unsaturated primary $C_3$- to $C_{24}$-alkanols or perfluoroalkyl alcohols of the formula $R_f(CH_2)_x$—OH, in which $R_f$ is $C_4F_9$ to $C_{18}F_{37}$ and x is an integer from 1 to 4.

7. The process as claimed in claim 1, wherein the alkoxylation is carried out at a temperature of 40 to 160° C. and a pressure of 2 to 6 bar.

* * * * *